United States Patent [19]

Beauchemin

[11] Patent Number: 4,923,360
[45] Date of Patent: May 8, 1990

[54] COLLAPSIBLE TAILGATE RAMP

[76] Inventor: Phillippe J. Beauchemin, 5216 - 55 Street, Box 1807, Bonnyville, Alberta, Canada

[21] Appl. No.: 126,094

[22] Filed: Nov. 30, 1987

[51] Int. Cl.$^5$ .................. E01D 1/00; B65G 67/02
[52] U.S. Cl. .................... 414/537; 14/69.5; 14/71.1; 182/195; 403/331; 403/381
[58] Field of Search .............. 414/537, 538, 477–480; 14/69.5, 71.1; 182/195, 207; 193/6, 35 TE, 38; 296/61; 403/331, 381

[56] References Cited

U.S. PATENT DOCUMENTS

| | | | |
|---|---|---|---|
| 595,453 | 12/1897 | Fischer | 182/195 |
| 606,520 | 6/1898 | Darrah | 193/6 |
| 2,611,466 | 9/1952 | Biggert et al. | 414/537 X |
| 3,011,670 | 12/1961 | Chatterton et al. | 414/479 |
| 3,559,826 | 2/1971 | Abromavage et al. | 414/537 |
| 3,642,156 | 2/1972 | Stenson | 414/537 |
| 3,713,553 | 1/1973 | Curtis et al. | 414/537 |
| 4,138,094 | 2/1979 | Thir | 403/381 X |
| 4,429,766 | 2/1984 | Alimbau Marques | 182/195 |
| 4,460,291 | 7/1984 | Lamendour | 404/35 |
| 4,527,941 | 7/1985 | Archer | 414/537 |
| 4,571,144 | 2/1986 | Guidry et al. | 414/537 |
| 4,628,561 | 12/1986 | Kushniryk | 414/537 X |
| 4,722,109 | 2/1988 | Mountz | 414/537 |

FOREIGN PATENT DOCUMENTS

| | | |
|---|---|---|
| 133243 | 5/1911 | Canada . |
| 167620 | 2/1916 | Canada . |
| 181908 | 1/1918 | Canada . |
| 1047710 | 2/1979 | Canada . |
| 1071811 | 2/1980 | Canada . |
| 1072705 | 3/1980 | Canada . |
| 3115953 | 11/1982 | Fed. Rep. of Germany ...... 414/537 |
| 230947 | 5/1944 | Switzerland .................. 403/381 |

OTHER PUBLICATIONS

Brochure entitled The "Ram-P", by White Ram Oilfield Services Ltd., Dec. 1986.

*Primary Examiner*—David A. Bucci
*Attorney, Agent, or Firm*—Beveridge, DeGrandi & Weilacher

[57] ABSTRACT

A portable tailgate ramp for attachment to pickup trucks, moving vans or the like is disclosed. The device is so constructed that it collapses to a shallow depth for storage on a tailgate and can be extended therefrom to form a ramp for running vehicles into the truck.

5 Claims, 5 Drawing Sheets

COLLAPSIBLE TAILGATE RAMP

FIELD OF THE INVENTION

This invention relates to a compact ramp for connection to and for use with the floor or tailgate of a truck. Specifically, the ramp is collapsible for easy storage in a truck and is quickly extendable therefrom to provide a ramp for loading vehicles or the like into the truck.

BACKGROUND OF THE INVENTION

There are several examples of extendable or telescopic ramps for pick-up trucks, shown in the art. Such examples are found in U.S. Pat. No. 4,571,144 Guidry et al, Feb. 18, 1986; U.S. Pat. No. 4,527,941 Archer, Jul. 9, 1985; U.S. Pat. No. 3,642,156 Stenson, Feb. 15, 1972; U.S. Pat. No. 3,713,553 Curtis et al, Jan. 30, 1973 and U.S. Pat. No. 4,628,561 Kushniryk, Dec. 16, 1986.

Many of the above mentioned patents disclose devices which, because of their large number of parts, would be very expensive to manufacture and are therefore not overly practical; and other examples show structures which, while probably providing utility, have areas in their constructions on which improvements could be made.

SUMMARY OF THE INVENTION

One object of the present invention is to provide a collapsible ramp for attachment to a tailgate of a pick-up truck or a doorway of a moving van or the like which can be quickly extended to ground level to provide a ramp of substantial strength for running vehicles from ground level into the truck or for hauling heavy cartons thereon etc.

Another object of the invention is to provide a ramp manufactured from a minimum number of parts without sacrificing the desired strength and rigidity of the ramp in extended position.

Another object of the invention is to provide the ramp in which the extendable sides thereof are made up of a plurality of members slidably connected together and which display a strong support to one another in the extended position.

According to a broad aspect, the invention relates to a portable, collapsible ramp for a truck tailgate or a doorway, the ramp having spaced sides interconnected by crossmembers. Each side of the ramp includes a plurality of beam members which are slidably connected one to another to lie in stacked, side-by-side relation when the ramp is collapsed and in elongated, staggered relationship to one to another when the ramp is extended. The crossmembers extend normal to the ramp sides, at least one crossmember being secured to and spacing each pair of beam members, one on either side of the ramp. A first pair of beam members is secured to the truck floor or tailgate and remaining pairs are slidably extendable therefrom. The beam members have support means along one side thereof that extend into a channel on an adjacent beam member which provides longitudinal support to that adjacent beam member when the ramp is extended.

BRIEF DESCRIPTION OF THE DRAWINGS

The above objects and features of the invention are illustrated by way of example in the accompanying drawings in which.

DETAILED DESCRIPTION OF THE PREFERRED EMBODIMENT

Figure 1:
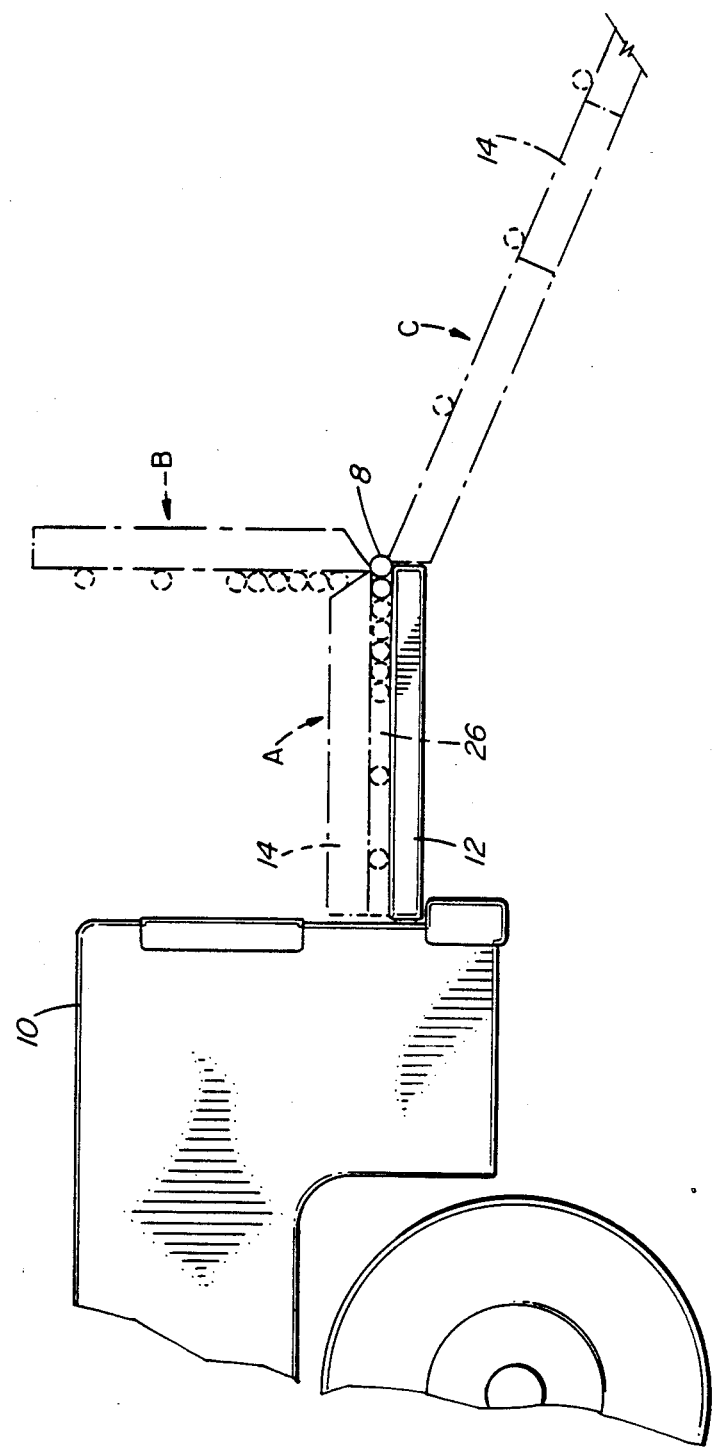
FIG. 1 is a fragmentary side view of the ramp of the present invention as mounted on the tailgate of a pick-up truck.
Figure 2:
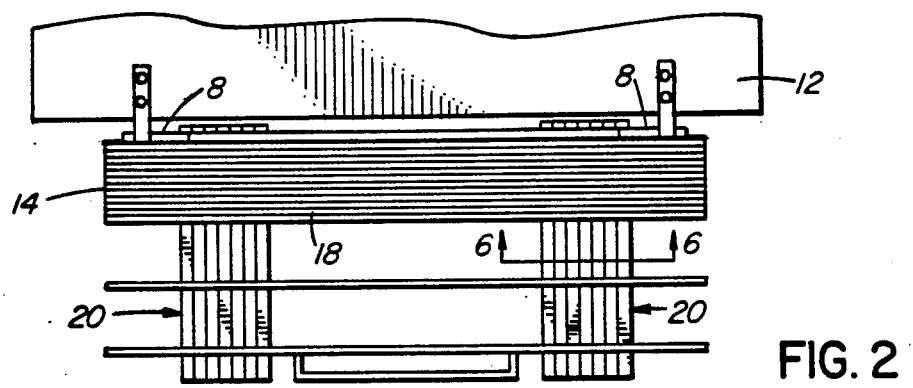
FIG. 2 is a plan view of the ramp in collapsed position, prior to extension.
Figure 3:
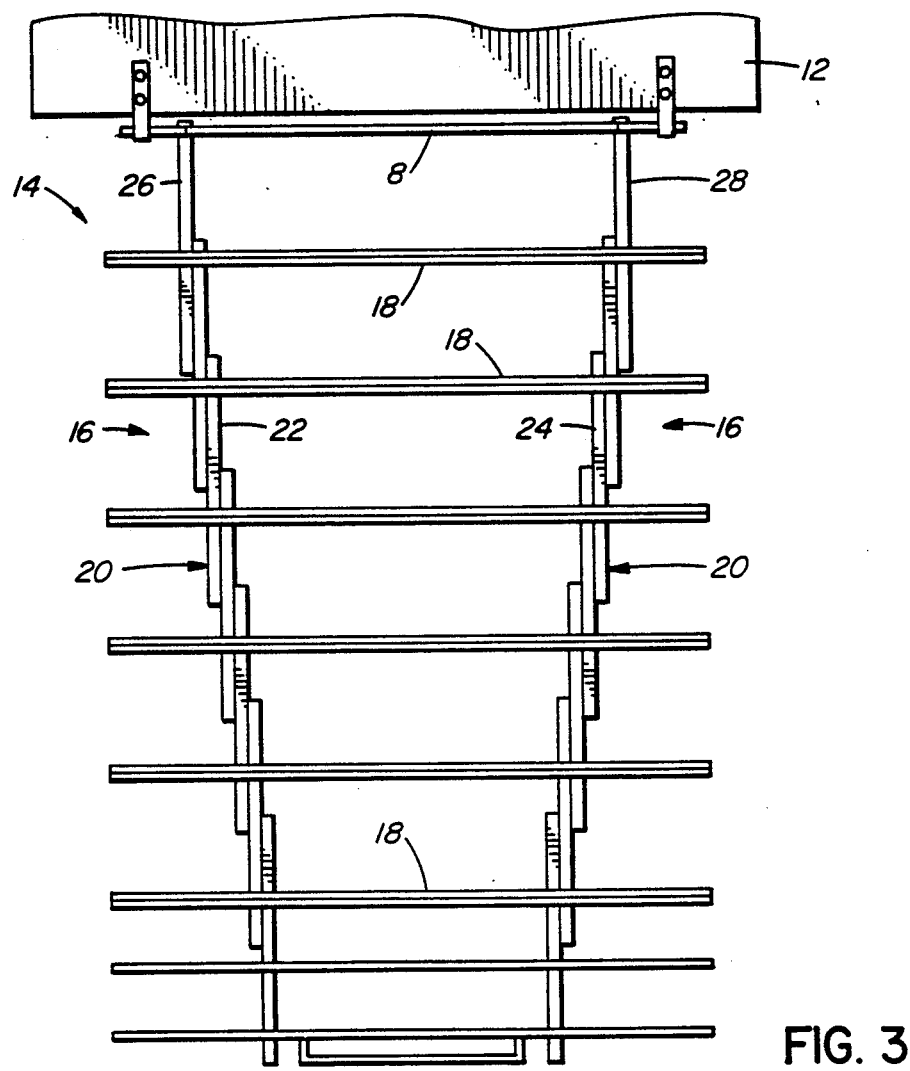
FIG. 3 is another plan view of the ramp in its extended position.

Referring to FIGS. 1-3 of the drawings, the rear of a pick-up truck 10 has a tailgate 12 to which is attached a portable, collapsible ramp 14 according to the present invention. It will be appreciated that while the invention is shown attached to a tailgate of a pick-up truck it is also applicable to the threshold of a side door of a moving van or the like. In FIG. 1, the ramp 14 is illustrated in a collapsed, inoperative position A lying on the tailgate of the truck; position B shows the ramp 14 being pivoted about its connection 8 to the tailgate; and position C shows the ramp in extended position.

Referring to FIGS. 2 and 3, each side 16 of the ramp 14 is made up of a plurality of beam members indicated generally at 20 and which are connected one to another to lie in stacked, side by side relation when the ramp 14 is collapsed, as shown in FIG. 2, and to assume an elongated, staggered relationship one to another when the ramp 14 is extended as shown in FIG. 3.

The cross members 18 can take any suitable form such as flat bar stock, barbed steel reinforcing rod, or one or more rods formed of round bar stock or the like, depending on the tractive requirements and weight of the vehicles or other articles to be loaded on the ramp. In the present example, we have illustrated a combination of single and double rods used as crossmembers 18.

As shown in FIG. 3, the crossmembers 18 extend normal to the ramp sides 16 with at least one crossmember being secured such as by welding to each pair of beam members such as beams 22 and 24 on either side of the ramp 14, the cross-members so secured serving to space those beam members 22, 24 apart from one another and to add rigidity to the unit in its extended position.

It will be observed from FIG. 3 that the crossmembers adjacent the tailgate end of the ramp are secured adjacent the forward or tailgate ends of the beam members 20 but this location is moved back somewhat with respect to each pair of beam members as one progresses towards the outer, ground end of the unit so that when the ramp 14 is collapsed, as shown in FIG. 2, the reinforcing rods stack neatly one against the other. The last pair of beam members at the outer end of the ramp 14 have a plurality of crossmembers to help tie in the terminal ends of the last pair of beam members and to provide an initial point of traction for a vehicle about to use the ramp.

It will also be observed that, the closer the beams are to the tailgate, the wider the spacing between each pair of beams and this provides a gradually widening support for a vehicle as it gets further off the ground and on to the tailgate of the truck.

As will be described later on in this specification, the crossmembers are not required for longitudinal strength, the beam members slidably engaging one another providing such strength due to their unique construction.

Figures 4, 5:
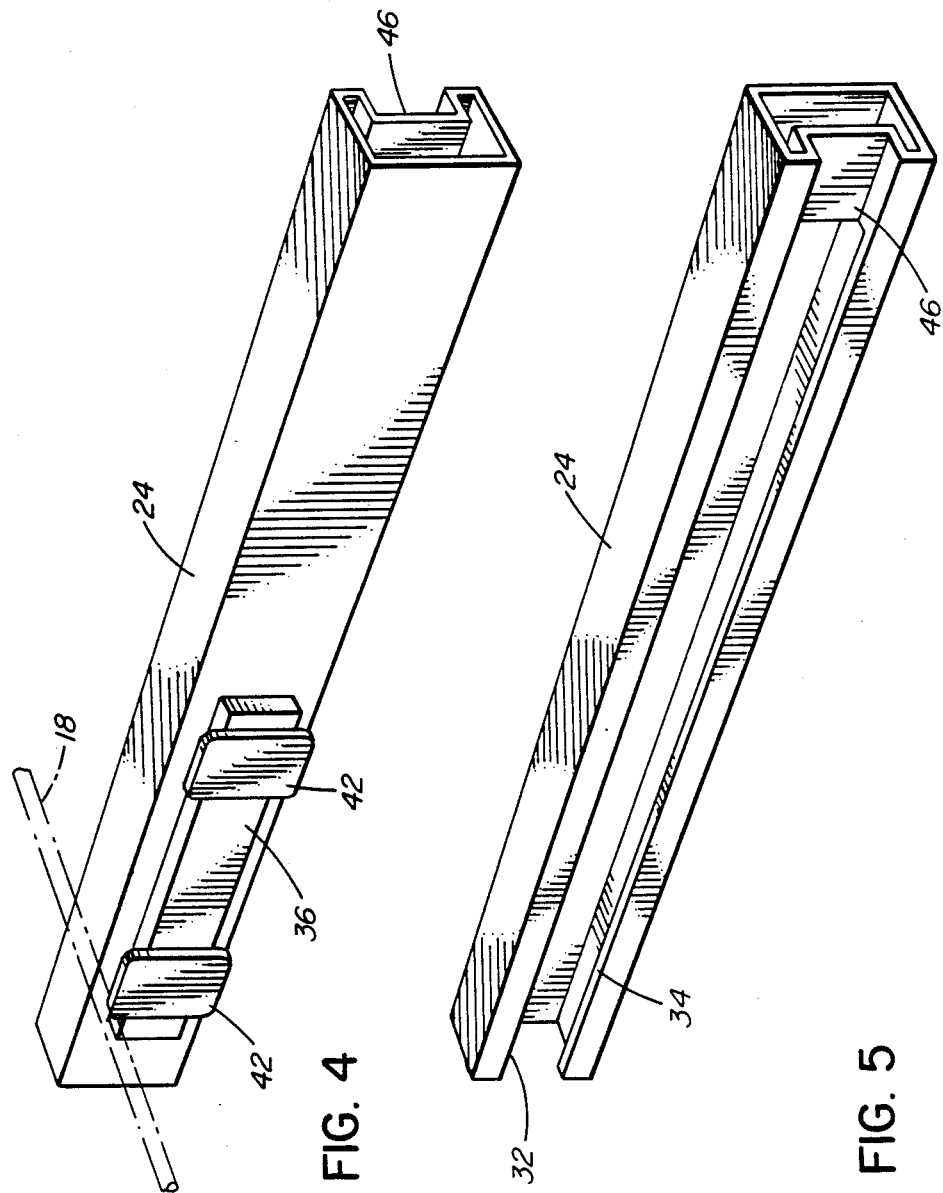
FIGS. 4 and 5 are perspective views of one beam member from the sides of the ramp, FIG. 4 disclosing one side of the beam member and FIG. 5 disclosing the other side.
Figure 6:
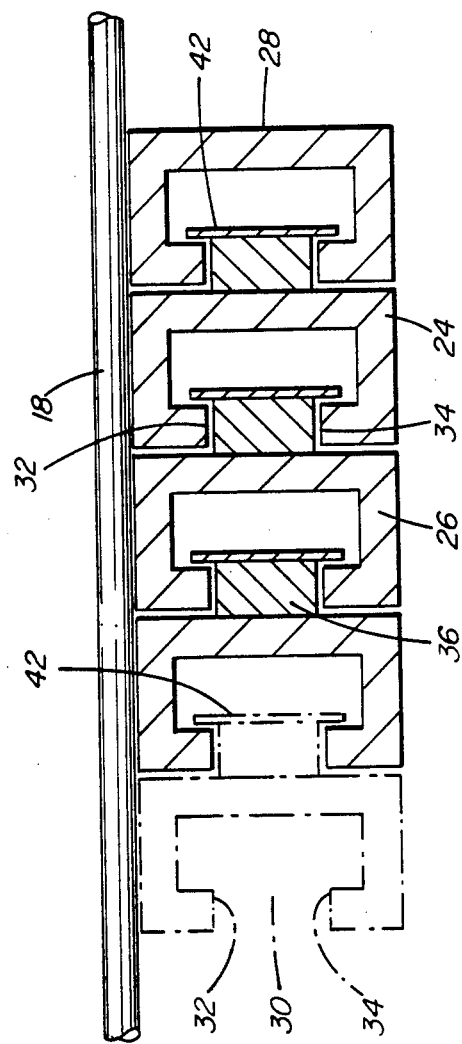
FIG. 6 is a sectional view taken along the line 6—6 of FIG. 2.

The first pair of beam members 26, 28 are pivotally secured as at 8 (FIG. 1) to the tailgate 12 of the truck and, as shown in FIGS. 4, 5 and 6 the beam members are of box-like structure each beam having, on one side thereof, an elongated channel 30 defined by a pair of spaced, parallel, upper and lower tracks 32, 34. With the exception of the first two beam members 26, 28 that are secured to the tailgate, the remaining beam members each have, on their exterior side opposite the channel 30, an elongated support means 36 which, as illustrated in FIG. 4, may take the form of a flat bar stock welded to the side wall of the beam member or it could conceivably consist of a plurality of separate sections of bar stock or the like. In any event, the support means 36 of beam 26 extends into and is located in the channel 30 of the adjacent beam member 24 and with some clearance, is engageable by the upper and lower tracks 32, 34 thereof to provide the longitudinal, slidable movement of one beam member with respect to its adjacent beam member.

As shown in FIGS. 4 and 6, suitable flange means 42 is provided on the support means 36 and is located slightly inwardly of the inside of the tracks 32, 34 and is somewhat wider than the channel 30 so as to limit lateral movement of the support means 36 on those tracks and thereby limit lateral movement between the adjacent beam members. The flange means may take the form of one or more rectangular lugs 42 as shown in FIG. 4 or it could take the form of one or more elongated strips of flat bar stock as illustrated in FIG. 6. Functionally, either form will do. Other configurations would be suitable.

Figure 7:
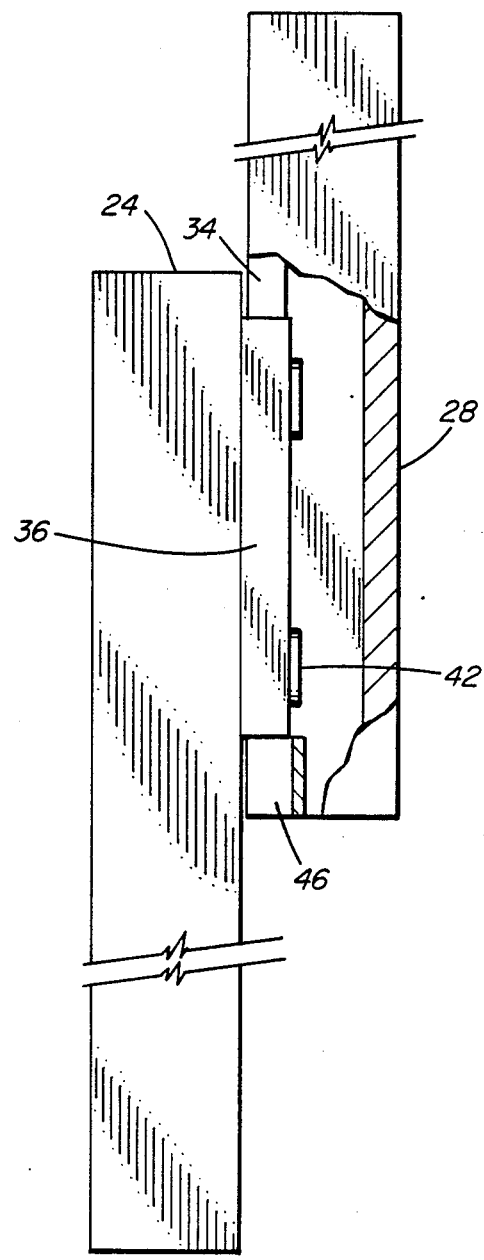
FIG. 7 is a plan view, partly in section, of two beam members in the extended position with respect to one another.

Lastly, stop means in the form of a flat plate 46 is located at one end of the channel 30 in the beam member and, when the ramp 14 is moved to its extended position as in FIG. 3, the stop 46 is engaged by the terminal end of the support means 36 to prevent one beam member from sliding out of contact with its adjacent beam member. FIG. 7 provides a good illustration of this.

It will be appreciated from FIG. 7 and from FIG. 4 that the length of the support member 36 provides a substantial linear support between one beam and the next. This strength is sufficient enough that the crossmembers 18 are not in fact required from the longitudinal strength point of view.

While the present invention has been described in connection with a specific embodiment thereof and in a specific use, those skilled in the art will appreciate that various modifications of the invention will be evident to them without departing from the spirit and scope of the invention as set forth in the attached claims.

Moreover, the terms and expressions which have been employed in this specification are used as terms of description and not of limitation and there is no intention in the use of such terms and expressions to exclude an equivalent of the features shown and described or portions thereof. It is however recognized that various modifications are possible within the scope of the invention claimed.

I claim:

1. A portable, collapsible ramp for a truck tailgate or doorway, said ramp having spaced sides interconnected by crossmembers;
    each side of said ramp comprising a plurality of beam members slidably connected one to another to lie in stacked, side-by-side relation when said ramp is collapsed, and in an elongated, staggered relationship one to another when said ramp is extended;
    said crossmembers extending normal to said ramp sides and at least one crossmember being secured to the upper surface of and interconnecting each spaced pair of beam members on either side of said ramp;
    a first pair of spaced beam members being securable at one of their ends to said truck tailgate or doorway and the remaining pairs being slidably extendable therefrom;
    said beam members of said remaining pairs thereof each comprising on one side thereof a channel defined by spaced, parallel, upper and lower tracks and, on the other side thereof, an elongated support means located in the channel of an adjacent beam member and engagable by said upper and lower tracks thereof and to provide longitudinal, sliding movement of one beam member with respect to said adjacent beam member;
    flange means on said support means of one beam member and spaced inwardly of said tracks in the adjacent beam member to limit lateral movement of said support means on said tracks and of said one beam member relative to said adjacent beam member; and
    means adjacent one end of said channels to limit longitudinal movement of said beam member with respect to its adjacent beam member.

2. A ramp according to claim 1 wherein the first crossmember adjacent the tailgate end of the ramp is secured to its associated pair of beam members adjacent the forward or tailgate ends of said beam members and wherein each crossmember in sequence along said ramp is secured to the associated beam members progressively further away from the tailgate ends thereof.

3. A ramp according to claim 1 wherein each beam member is of box-like structure and rectangular cross-section; said elongated channel in said beam member opening on the inward side of said ramp to receive the elongated support means on the outward side of an adjacent beam member.

4. A ramp according to claim 1 wherein said elongated support means has flat, parallel upper and lower surfaces and wherein said upper and lower tracks of said beam members have flat, spaced, parallel surfaces in juxtaposition to said surfaces of said support means, said flange means being located within said channel and being wider than the spacing of said upper and lower tracks.

5. A ramp according to claim 1 wherein the means to limit longitudinal movement of said beam member with respect to its adjacent beam member comprises stop means in the form of a plate member located at one end of said channel in the beam member and bridging the upper and lower tracks thereof so as to be engaged by a terminal end of said support means in an adjacent beam member.

* * * * *